A. H. HOWELL.
AXLE SHAFT BEARING.
APPLICATION FILED JUNE 22, 1920.
1,363,118.
Patented Dec. 21, 1920.
2 SHEETS—SHEET 1.
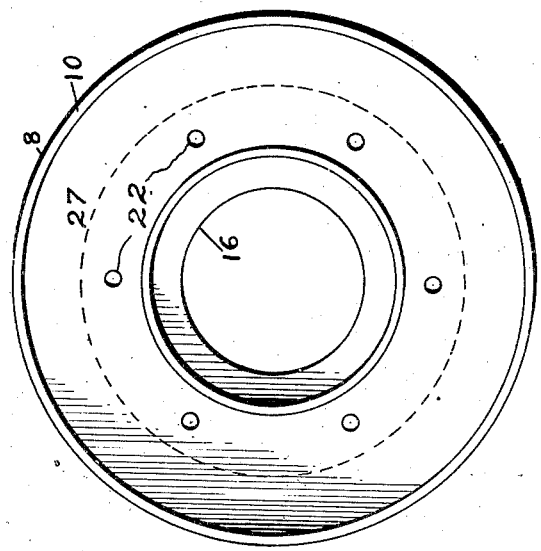
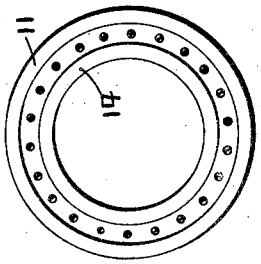
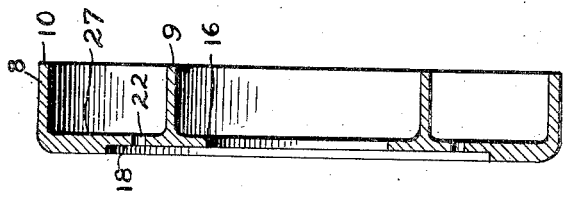
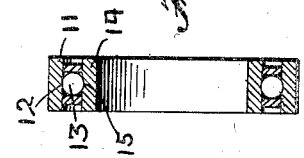
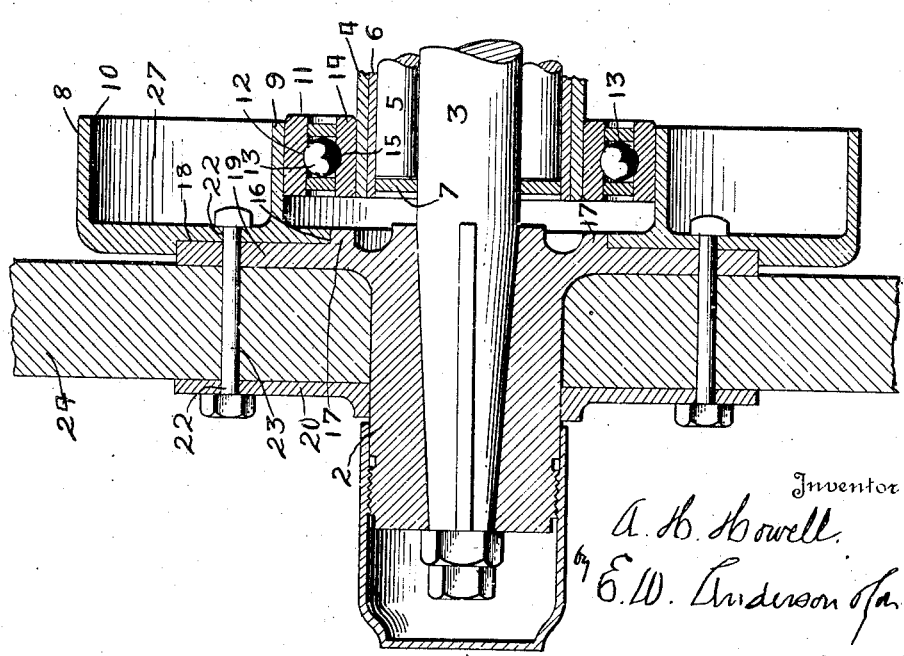

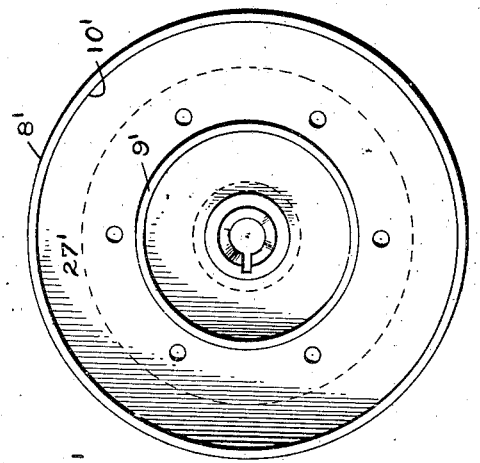
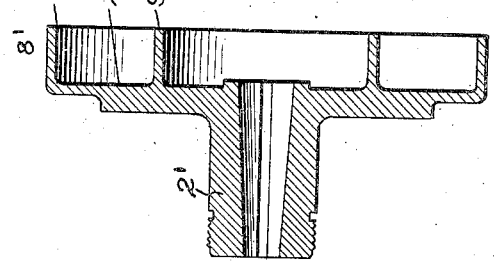
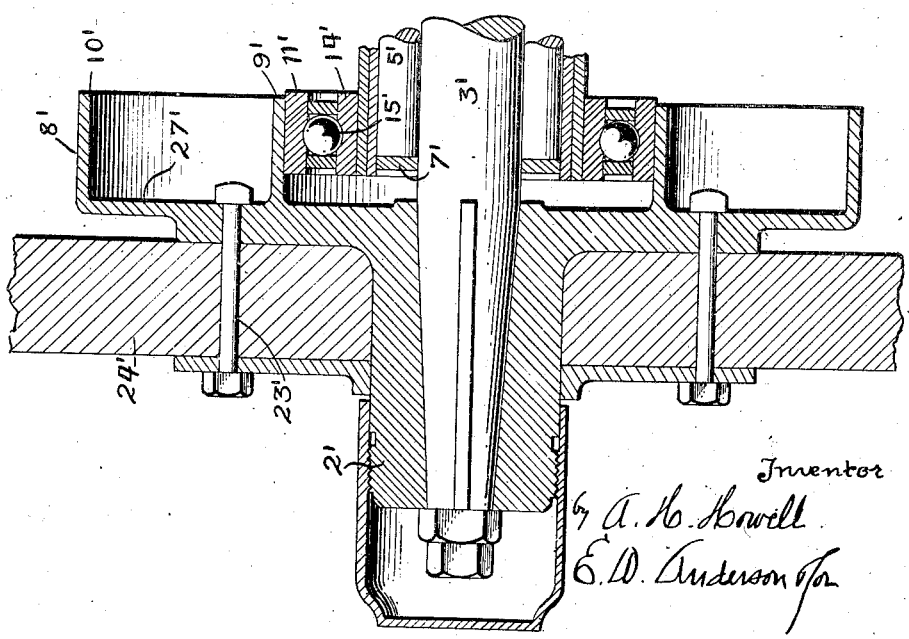

UNITED STATES PATENT OFFICE.

ARCHIE H. HOWELL, OF SACRAMENTO, CALIFORNIA.

AXLE-SHAFT BEARING.

1,363,118.  Specification of Letters Patent.  Patented Dec. 21, 1920.

Application filed June 22, 1920. Serial No. 390,727.

*To all whom it may concern:*

Be it known that I, ARCHIE H. HOWELL, a citizen of the United States, resident of Sacramento, in the county of Sacramento and State of California, have made a certain new and useful Invention in Axle-Shaft Bearings; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a central transverse section of the invention as applied, with parts broken away.

Fig. 2 is a detail central transverse section of the brake drum.

Fig. 3 is a detail face view of the same.

Figs. 4 and 5 are detail sectional and face views of the anti-friction bearing.

Fig. 6 is a view similar to Fig. 1, showing a modification.

Fig. 7 is a detail sectional view of the brake drum and hub as in this modification, and Fig. 8 is a detail face view of the same.

The invention has relation to an attachment for motor cars and trucks of the Ford type, having for an object to provide durable and efficient means readily applicable, for relieving the rear axle shaft of the strain of the load which at present causes breakage of the axle shaft in cases of overload or unusual strain. Other objects and advantages will appear.

The invention consists in the novel construction and combinations of parts, as hereinafter set forth.

In the accompanying drawings illustrating an embodiment of the invention, the numeral 2 designates the hub of a Ford car or truck; 3, the rear axle shaft; 4, the rear axle housing; 5, the roller bearings; 6, the roller bearings sleeve, and 7 the roller bearings steel washer.

At present the strain of the load is transmitted through the rear axle housing to the roller bearings, and therefrom to the rear axle shaft, and causes breakage of the axle shaft as stated.

To relieve this strain and avoid this breakage, applicant discards the present rear axle brake drum, and substitutes therefor a rear axle brake drum 8, of the same general dimensions as the discarded drum, and provided with a hollow cylindrical extension 9, integral therewith and concentric with the circumferential outer wall 10 of the drum. Suitable anti-friction bearings are interposed between the extension 9 and the rear axle housing, being preferably of the Hesperad type, consisting of a ring 11, provided with an inner circumferential raceway 12; balls 13, traveling therein, and an inner ring 14, having a raceway 15, within which the balls also travel, the inner circumferential surface of the ring 14 being closely engaged by the rear axle housing and held rigid therewith through friction, the outer ring 11 being also rigid through friction with the extension 9.

As a result, the strain of the load is transmitted from the rear axle housing to the cylindrical extension 9, and to the brake drum with which said extension is integral, as well as to the rear axle shaft.

The brake drum is provided with a central aperture 16, of the proper diameter to have its circumferential marginal wall closely engage the outer circumferential wall of the annular extension 17 of the tube 2, whereby the strain of the load is transmitted from the brake drum to said hub, and to further transmit the strain of the load from the brake drum to the hub, the former is provided with a lateral recess 18, wherein fits the flange 19 of said hub, the circumferential edge of said flange closely engaging the circumferential wall of said recess. The outer plate 20, loosely engaging the hub, the flange 19 and the brake drum side wall 21 are provided with alined apertures 22, spaced apart annularly and engaged by bolts 23, spokes 24 fitting between the outer plate 20 and the hub flange. It is common to provide a device having a hollow cylindrical extension concentric with the circumferential wall of the brake drum but made separately therefrom and connected thereto by an annular series of bolts passing through the hub flange and outer plate, anti-friction bearings being interposed between said extension and the rear axle housing, this device being also for the purpose of relieving the rear axle shaft of the strain of the load, but it is found in practice that the said bolts shear off, and an object of this invention is to prevent the shearing off of the bolts. The extension 9 formed integrally with the brake drum is of special importance in preventing this shearing, and the lateral recess 18, engaged by the hub flange, is of assistance in preventing this shearing.

In Figs. 6, 7 and 8 of the drawings a modification of the invention is shown, wherein the rear axle brake drum 8' and the hub 2' are formed integrally, or in one piece, the hollow cylindrical extension 9' of the brake drum being integral therewith, as in the preferred form of the invention. In this modification the other parts of the device are designated by the same reference numerals as in the preferred form, differentiated by the exponent 1.

The invention is readily applicable to any Ford car or truck at slight expense, and is found in practice to materially increase the mileage with a given expenditure of fuel, and to increase the loading capacity at least twice.

I claim:

1. Means for relieving the rear axle shaft of a motor vehicle of the strain of the load thereon, consisting of an axle shaft, a stationary housing therefor bearing the load, anti-friction bearings between said housing and said shaft, a brake drum having a hollow cylindrical extension integral therewith, and anti-friction bearings between said housing and said extension.

2. Means for relieving the rear axle shaft of a motor vehicle of the strain of the load thereon, consisting of an axle shaft, a stationary housing therefor bearing the load, anti-friction bearings between said housing and said shaft, a brake drum having a hollow cylindrical extension integral therewith, an outer lateral recess and a central aperture, anti-friction bearings between said housing and said extension, and a hub having a flange closely engaging said lateral recess and provided with an annular extension closely engaging said aperture.

In testimony whereof I affix my signature in presence of two witnesses.

A. H. HOWELL.

Witnesses:
  GEORGE M. ANDERSON,
  STUART HILDER.